May 10, 1927.

J. M. COBURN ET AL 1,628,230

UTILIZING FABRIC OF AIRCRAFT AS DIAPHRAGM FOR LOUD SPEAKERS

Filed June 2, 1926    2 Sheets-Sheet 2

WITNESSES

INVENTOR

Patented May 10, 1927.

1,628,230

UNITED STATES PATENT OFFICE.

JAMES M. COBURN AND BERNARD KNAPP, OF KANSAS CITY, MISSOURI, ASSIGNORS TO PLANE SPEAKER CORPORATION, OF KANSAS CITY, MISSOURI, A CORPORATION OF DELAWARE.

UTILIZING FABRIC OF AIRCRAFT AS DIAPHRAGM FOR LOUD SPEAKERS.

Application filed June 2, 1926. Serial No. 113,181.

This invention relates to aircraft structures, more especially to the utilization of sections of the covering material of aircrafts for sound producing diaphragms.

In a copending application, Serial No. 29,839, filed May 12, 1925, entitled Aeroplane amplifier is disclosed apparatus for projecting audible sounds from aircraft over a relatively wide area by means of amplifiers and sound projecting horns.

In the present invention a sound amplifying system similar to that disclosed in the aforementioned application is utilized, but the present invention distinguishes therefrom in that it is proposed to utilize sections of the covering material of the aircraft for sound producing diaphragms thereby entirely dispensing with sound projecting horns.

It is proposed to utilize the covering material of aircraft generally such as the so-called "doped fabric" utilized for the fuselage and wing covering and also employed in lighter than air machines. The nature of the doped fabric or covering and the manner of its application to aircraft structures is such that a taut resonant sheet is formed between the braces and frame structure of the wings, fuselage or gas carrying member, and such surfaces are herein proposed to be utilized as diaphragm sections for producing sound in a well known manner.

It is among the objects of this invention to provide sound reproducing devices that are mounted in the frame structure of aircraft and secured to sections of the covering material at intervals for the purpose of producing audible sounds.

Another object of this invention is to provide a series of reproducing members disposed at intervals along the wing structure of an aircraft and secured to the covering material underneath the wing to constitute sections thereof diaphragm members for producing audible sounds.

Another object of this invention is to provide means for mounting reproducing members of the above designated character in the cross bracings or lattice work of an aircraft structure in proximity to the covering material with which the frame portion is covered and connecting the mounted reproducers to the covering material.

Figure 1:
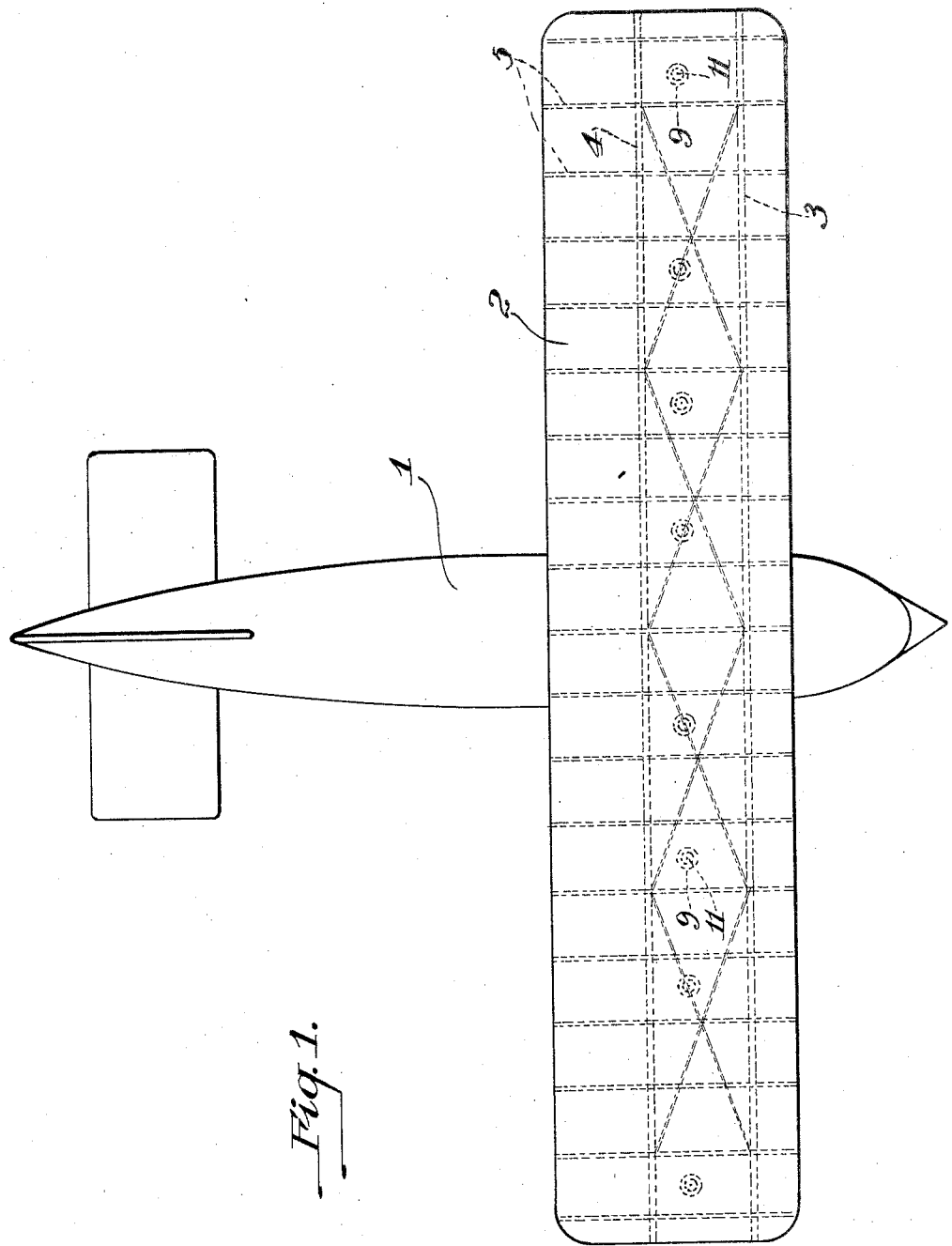
Figure 2:
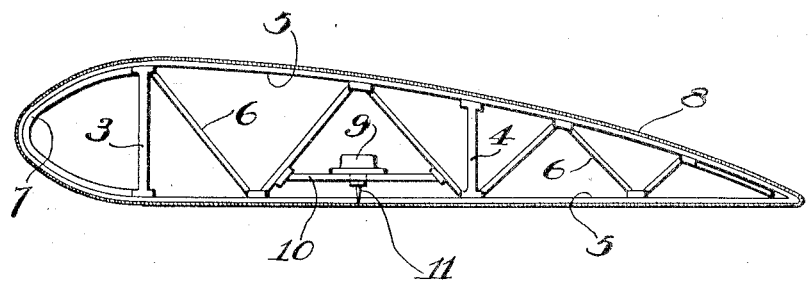
Figure 3:
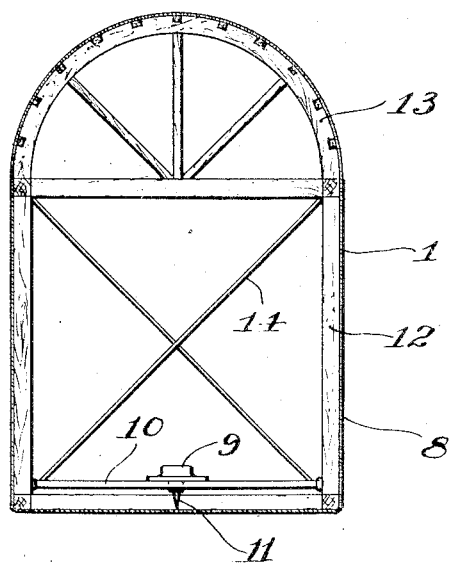

In the accompanying drawings constituting a part hereof and in which like reference characters designate like parts, Fig. 1 is a top plan view of an aircraft illustrating the structural elements of the wing member and the disposition of sound reproducing members therein in accordance with this invention; Fig. 2 is a sectional view of the wing members illustrating the mounting of the reproducer member in the frame portion thereof; and Fig. 3 is a cross sectional view of the fuselage illustrating the manner of mounting sound reproducing members in the bottom portion thereof.

Referring to the several figures of the drawings the structure therein illustrated comprises an embodiment of the fuselage and wing construction 1 and 2, respectively, which are formed of light weight structural elements suitably reinforced by cross bracings, I-beams and the like to provide the requisite rigidity and strength in accordance with common practice.

The wing structure usually comprises a pair of I-beams 3 and 4 running longitudinally of the wing transversely to the longitudinal axis of the fuselage. The beams 3 and 4 are usually of wood or Duralumin or other light weight materials and are mounted in suitable spaced relation and so held by cross braces 5 and members 6 arranged to constitute lattice work and the leading edge of the wing is usually provided with sheathing 7 such as wood or other pliable substance. The cross braces 5 are spaced in the manner shown in Fig. 1 on both the upper and lower portions of I-beams 3 and 4 to constitute a frame work around which the covering material 8 is secured. The covering material in most aircraft structures comprises a so-called doped fabric which is a strong, finely woven fabric of uniform texture treated with weather-proofing materials such as cellulose nitrate or cellulose acetate which in addition to its weather-proofing characteristics whereby the fabric is made impervious to moisture and atmospheric conditions renders the fabric so treated very taut and provides it with a hard wear-resisting surface.

In applying the covering material a fabric previously treated with a diluted mixture of the so-called dope is stretched around the frame portion of the wing and fuselage and then sewn or secured in any suitable manner. The dope or weather-proofing substance is then applied in several coats, each application causing a shrinkage of the fabric covering which gradually becomes taut between the frame sections.

Incidentally fabric of the quality utilized for aircraft covering materials when treated or doped in this manner possesses very good resonance qualities and materials of this nature have been extensively employed for diaphragms in sound reproducing devices for graphophones or loud speakers.

In accordance with this invention it is proposed to utilize sections of the covering material of the wing, fuselage or other portions of aircraft as sound reproducing diaphragms and this is accomplished by mounting a sound reproducing member 9 such as is commonly employed in loud speaking horns inside of the frame structure of the aircraft as is shown in Figs. 2 and 3, the sound reproducer being mounted on a supporting brace 10 which is secured to the lattice work or bracing members 6 of the wing structures at intervals along the length of the wing as shown in dotted lines in Fig. 1, the reproducing member 9 being disposed centrally of a covering section stretched across the cross bracing 5 to constitute the particular section of fabric or covering material a sound reproducing diaphragm member. The reproducing element 9 is secured to the covering material by a plug 11 or any suitable connecting device which is capable of agitating the fabric to which it is connected in accordance with the frequency oscillations of the amplifying circuit in which the reproducer member 9 is connected in identically the same manner as in the utilization of relatively small area diaphragms such as are employed in amplifiers and the like. Any number of reproducer elements 9 may be mounted in the frame portion of the wing structures at spaced intervals as shown in Fig. 1, or such reproducers may be mounted on other portions of the aircraft, for instance in the fuselage as shown in Fig. 3.

The fuselage is usually constructed of frame members 12 formed to constitute a substantially rectangular shape and a curved member 13 is secured to the top portion thereof to provide a rounded top or otherwise form the fuselage to a desired shape. The frame members 12 are usually provided with cross bracings 14 to make the structure self-sustaining and to provide the necessary rigidity.

The frame portions 12 are in spaced apart relation and secured by longerons to form the frame work of the fuselage around which the covering material 8 is stretched and secured in the manner described in connection with the covering of the wing members. The lower covering material of the fuselage is accordingly divided into sections by the bracing elements in a manner similar to the wing members and these sections underneath the fuselage may be utilized as sound producing diaphragms by connecting them to the sound reproducing devices 9 which are mounted on supports 10 secured to the side frames in the manner of mounting the reproducer devices in the wing frames. Thus a number of reproducers may be disposed in spaced relation along the bottom of the fuselage structure and secured to the bottom covering fabric of the fuselage for the purpose of producing audible sounds.

It is evident from the foregoing description of this invention that the covering materials of aircraft may be utilized as sound reproducing diaphragms in the form of suitable resonant materials and operated by sound reproducing devices mounted in the manner as herein set forth.

We claim:

1. An aircraft comprising in combination an expanded frame structure having a surface covering secured thereto, and a sound reproducing device secured to said cover to constitute a section thereof a sound producing diaphragm.

2. An aircraft comprising in combination an expanded frame structure having a surface covering secured thereto, and a sound reproducing device mounted on said frame structure and secured to said cover.

3. An aircraft comprising in combination an expanded frame structure having a surface covering secured thereto, and a plurality of sound reproducing devices mounted at intervals on said frame structure and secured to said cover to constitute sections of the latter sound producing diaphragms.

4. An aircraft comprising in combination an expanded frame structure having a surface covering secured thereto, and a plurality of sound reproducing devices mounted at intervals on the frame structure of the wings, said reproducing devices being secured to said cover to constitute sections of the latter sound producing diaphragms.

5. An aircraft comprising in combination an expanded frame structure having a surface covering secured thereto, and a plurality of sound reproducing devices mounted at intervals on the frame structure of the wings, said reproducing devices being secured to the cover underneath the wing structure to constitute sections of the latter sound producing diaphragms.

6. An aircraft comprising in combination an expanded frame structure having a surface covering secured thereto, a plurality of sound reproducing devices mounted on said structure and secured to said cover underneath said aircraft to constitute sections of said cover sound producing diaphragms.

7. An aircraft comprising in combination an expanded frame structure having a surface covering secured thereto, a sound reproducing device mounted on the fuselage structure thereof, and secured to the cover underneath said fuselage to constitute a section of said cover a sound producing diaphragm.

In testimony whereof, we hereunto sign our names.

JAMES M. COBURN.
BERNARD KNAPP.